Oct. 9, 1962         C. L. MILES         3,057,249
REFLEX FINDER HAVING A TRANS-ILLUMINATED FRAME
MARK AND LIMITED DIFFUSION OF LIGHT
Filed Feb. 5, 1960
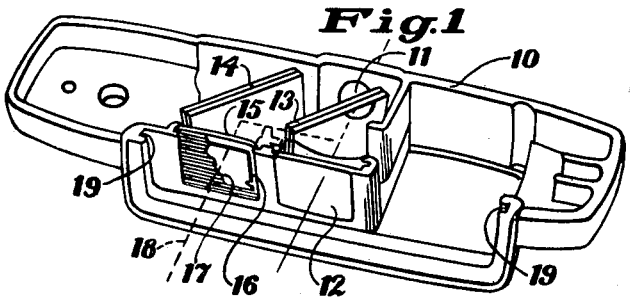
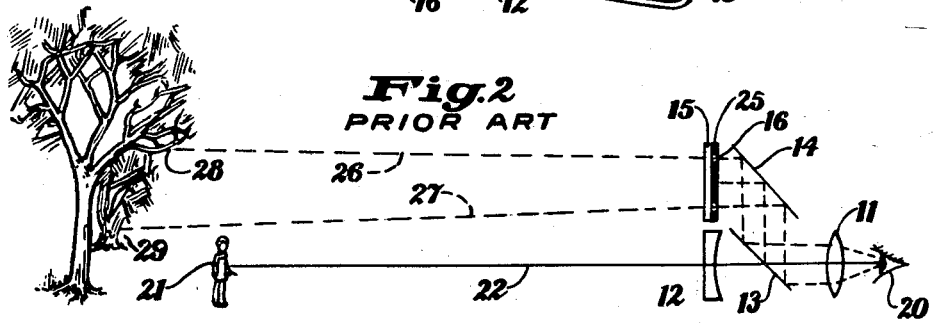
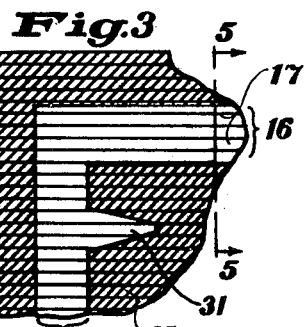 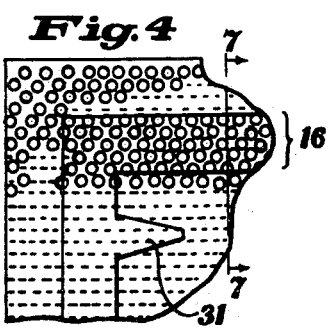
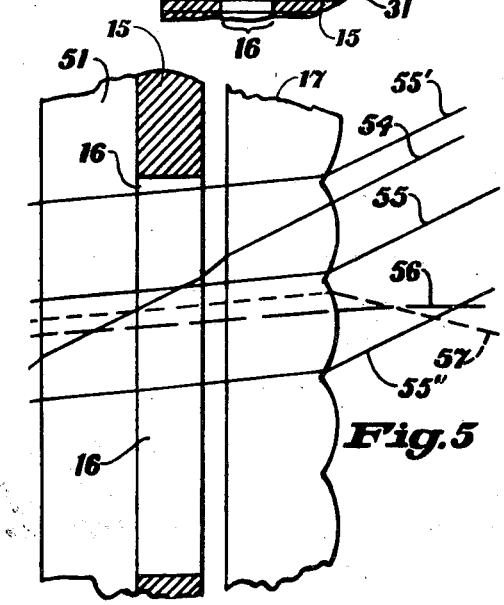 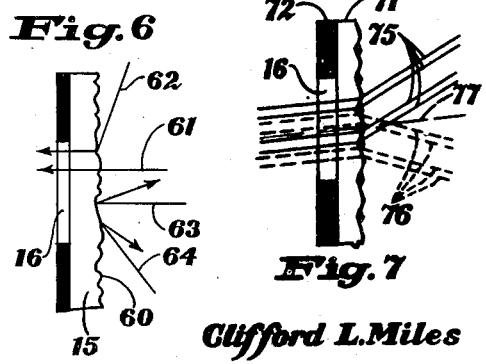
Clifford L. Miles
INVENTOR.
R. Frank Smith
BY
J. M. Emerson Holmes
ATTORNEYS 3,057,249
REFLEX FINDER HAVING A TRANS-ILLUMINATED FRAME MARK AND LIMITED DIFFUSION OF LIGHT
Clifford L. Miles, Hartford, Conn., assignor to Eastman Kodak Company, Rochester, N.Y., a corporation of New Jersey
Filed Feb. 5, 1960, Ser. No. 6,959
2 Claims. (Cl. 88—1.5)

This is a continuation-in-part of my application Serial No. 706,840, filed January 2, 1958, now abandoned.

This invention relates to photographic viewfinders and other sighting instruments of the type comprising frame marks or other reticle pattern and optical means for causing an image of the reticle pattern to appear at a great distance superimposed upon the scene to be photographed. In particular, it relates to finders in which the frame marks are formed as a transparent rectangular outline in a nontransparent area and are illuminated by light coming from the general direction of the scene to be photographed.

Photographic finders differ from other types of sights chiefly in that instead of a reticle having cross hairs or lines crossed at the center with or without a series of concentric circles around the center, as in certain gun sights or bomb sights, for example, the photographic finder has the rectangular frame marks outlining the field which is covered by the camera with which the finder is adapted to be used. In other respects, the two types of sights are very much alike and the present invention applies to both.

The object of the invention is to provide improved means if illuminating the transparent frame mark by natural light.

It is a particular object of the invention to provide a transparent frame mark which receives its main illumination from the scene being photographed, but which appears bright even when the scene is one of low illumination.

Photographic viewfinders and other sighting instruments such as rifle sights are known in which a rectangular frame mark or other reticle pattern is outlined in transparent lines in a non-transparent, usually opaque, plate or layer, in which this rectangular frame or reticle pattern is illuminated from the front, that is, by light coming from the general direction of the scene being viewed, and in which beam-combing means are provided for combining a portion of the light from the reticle pattern and a portion of another beam of light from the scene being viewed into a single beam of light so that an image of the frame or reticle mark appears at a great distance superimposed on the field of view. The beam-combining means always includes a partially transparent, partially reflecting surface which receives light from the reticle marks on its one side and light from the scene being viewed on its other, a portion of each beam being reflected and a portion of each beam being transmitted so that when the observer's eye is placed in either of these combined beams, light is received partly from the reticle marks or frame marks and partly from the scene being viewed.

A number of different arrangements of the parts are known in finders of this type, as illustrated in U.S. Patent No. 2,525,558, Mihalyi; U.S. Patent 2,780,129, Wood; German Patent 915,649, Ort; German Patent 925,808, Gehrke; and German Patent 935,884, Leitz.

The semi-transparent mirror used for combining the two beams may be lightly silvered or aluminized or it may have a dichroic optical interference coating in known manner, and it may be coated over the whole surface or just around the edge depending on the shape of the frame marks.

The invention applies to any of these known variations and to others as will be apparent to those skilled in the art.

The problem which arises is the same in all cases. If one illuminates the frame with direct skylight (by having it face upwards) the relative brightness of the frame and scene varies far too much to be satisfactory. In some cases the frame is dazzling bright or, if filters are included to prevent this, the frame on cloudy days is far too dim. Also, in indoor photography, one rarely has a source of steady illumination directly above the camera. The normal way to avoid such drastic variations is to use light coming from the subject itself. Thus the relative brightness of the frame and the scene stay more or less constant.

However, this brings up another problem. The frame becomes barely visible and almost useless when the scene is a low brightness one. Also there is still some variation in relative brightness depending on whether the scene is front illuminated, side illuminated or back illuminated. The present invention solves these latter problems and requires a semi-diffuser with a specified degree of diffusion (in the illuminating system) to give adequate brightness when the scene is dim and to give more or less uniform brightness relative to the scene (on which the frame appears superimposed) whether the scene is front, side or back illuminated. The value of the invention in this latter connection is proved by a statistical survey of scenes selected at random from those taken by average photographers.

When faced with these problems, I first tried placing a piece of ground glass or milk glass over the front of the frame marks to make the illumination more uniform. This arrangement succeeds in making the illumination of the frame lines more uniform, even when the scene is quite non-uniform in brightness. However, it fails to solve either of the problems. It renders the frame lines too dim to be seen under conditions of low general illumination and under front lighting of the scene. Of course the frame mark can be made relatively brighter by making the scene appear relatively darker, for example by putting a filter in the beam from the scene or by making the partially reflecting surface reflect a high percentage of the light and transmit only a small percentage, but this leads to the alternative difficulty of making it very difficult to see the scene clearly in dim light.

According to the present invention, the highly diffusing ground-glass screen which I had tried and found to be inferior, is replaced by a light-diffusing means consisting of a sheet of transparent material having on one surface thereof a large number of contiguous lenticules covering at least the transparent area of the frame marks and adapted to diffuse normal incidence light over an angle between 20° and 45° from the normal. That is, a substantial amount of light is diffused more than 20° but practically none is diffused more than 45°. Light is diffused between 0° and 20°; the outer limit is between 20° and 45°. A ground glass would diffuse a considerable percentage of the light more than 45° and hence appeared promising when trying to direct skylight into the frame marks. The less diffusing material turns out to be much preferable however, as pointed out above. In fact, it works whereas ground glass is not much better than, and is some times worse than, no diffuser at all. The lenticules may be either parallel cylindrical lenticules or small circular, oval or polygonal lenticules scattered in a regular or random pattern over the surface of the sheet of material. The lenticules are preferably small enough so that at least three of them fit into the width of a frame mark. This gives the frame mark an apparent texture of fine lines or dots or small circles as viewed through the viewfinder whereas a smaller number of lenticules of larger size make the frame mark appear to move noticeably when the eye is moved, to one side or the other slightly. The lower practical limit of size is approximately one two-thousandth of an inch at about which point diffraction effects begin to predominate.

Finders according to the invention may be made up, of course, either as an accessory to be attached to an already existing camera or as an integral part within a camera housing.

Specific embodiments of the invention will now be described with reference to the accompanying drawings in which:

FIG. 1 shows a finder according to the invention mounted in a portion of a camera body, shown upside down.

FIG. 2 is a schematic diagram used in explaining certain principles of the invention.

FIG. 3 is a detail of FIG. 1, front view.

FIG. 4 corresponds to FIG. 3 and shows a different form of the invention.

FIG. 5 is a fragmentary diagrammatic cross-section of FIG. 3, greatly enlarged.

FIG. 6 shows a similar diagrammatic cross section, illustrating the effect of ground glass as a diffuser.

FIG. 7 is an enlarged diagrammatic cross-section of FIG. 4.

FIG. 1 shows a finder according to the invention assembled in the top portion or cover 10 of the body of a miniature camera. A negative objective lens 12 of rectangular periphery and a positive eye lens 11 make up an afocal reverse Galilean finder system of known type. A partially transmitting mirror 13 is mounted diagonally in the beam between lenses 11 and 12 and acts as the beam combiner above-described. A second mirror 14 is mounted accurately parallel with mirror 13 and is fully reflecting. A flat plate 15 is mounted beside the negative lens 12 and in front of the mirror 14 and is opaque or nearly opaque over all of its area except for frame marks 16 outlining a rectangular area. In front of the plate 15 is the lenticular diffusion screen 17 shown broken away which is the principal feature of the invention. The frame marks 16 are viewed through the eye lens 11 by reflection in the two mirrors along the dotted optical axis 18. Since the center of the plate 15 is opaque the dotted line 18 does not represent a ray of light but the optical axis thereof. The focal length of the eye lens 11 is chosen to be equal to the optical distance from the frame marks 16 so that the frame marks appear to be at infinity or substantially so. The size of the rectangle 16 is chosen with respect to the focal length of the eye lens so that it bounds the angular field which is to be photographed by the camera with which the finder is designed to be used. The whole finder is assembled in the body portion 10 upside down as shown and the main body of the camera brought down in mutually fitting relationship and attached, and this holds some of the optical parts in the slots provided for their support. Other parts are mounted firmly in brackets in the body portion 10. A slot 19 is provided to receive a plate of glass covering the whole front of the finder and forming a front protective window.

Finders in which the frame is projected "virtually" upon a distant scene have the great advantage that the eye may be moved about without destroying the accuracy of the finder through parallax errors. Of course the eye can only be moved as far as the diameter of the eye lens 11 permits, as beyond this boundary the eye receives no light through the finder. Moreover, the eye must remain within a restricted distance behind the eye lens 11, otherwise the observer would see only the center of the field of view and would not see the frame marks projected into the distance. This space within which the eye is free to move about may be referred to as the eye position. It may be noted that some forms of finder do not have an eye lens but only an aperture or a flat transparent plate of restricted diameter, and that such a structure delineates or defines the eye position.

FIG. 2 is a schematic diagram of a viewfinder of a type in which the present invention may be embodied and includes a representation of a scene to be photographed, the finder being shown many times enlarged with respect to the size of the scene. An observer's eye 20 at the eye position looks through the eye lens 11 and objective lens 12 of the reverse Galilean finder and sees for example the FIGURE 21 at the center of the field of view along the optical axis 22. Interposed in the viewfinder beam between the two lenses 11 and 12 is a semi-reflecting surface 13 and facing it a second surface 14 which is fully reflecting. In front of the mirror 14 and alongside the negative lens 12 is a plate 15 for supporting the frame marks which may be made up for example by providing a photographic emulsion layer 25 and exposing and developing it so that the frame marks 16 are substantially transparent and the remainder of the area is substantially opaque. Through the transparent portion 16 the observer receives rays of light 26, 27 from the field of view which are supposed to make the frame outline 16 appear bright against the object 21 being viewed. It will be noted that because of the exaggeration in size, the two rays 26, 27 appear to come from above the FIGURE 21 whereas actually they would come from the two edges of the field of view above and below the FIGURE 21. Nevertheless, it will be seen that if the rays 26, 27 originate from dark areas 28, 29 that the light received from these directions will be comparatively dim. This dimness of the light is intended to be represented by the dotted manner of drawing these rays. On the other hand, if the rays 26, 27 from the edge of the field of view originate in bright areas, then the frame 16 or the portions of frame 16 corresponding to bright areas will appear bright and the object of central interest 21 may in certain circumstances be too dimly lighted to be seen clearly, particularly if the mirror 13 has been made up to reflect a large percentage and transmit a small percentage of the light.

This problem of illumination has long been recognized but seemed to be without solution. I, and possibly others, have tried a layer of ground glass or a ground front surface of the plate 15, in front of the frame lines 16 to bring in skylight, but for reasons discussed previously, this does not work. Under the very conditions in which the clear frame is too dim to be useful, the addition of ground glass leaves it not appreciably brighter.

The finder in FIG. 2 faces left, whereas those in FIGS. 5, 6 and 7 face right. FIGS. 5 and 7 are described later. FIG. 6 shows the effect of a ground glass surface 60. Some light 61 from the scene does pass through, and serves to illuminate, the frame line 16. Also skylight 62 may be usefully reflected through the line 16, which is highly desirable when the scene itself is dim. However, much of the light 63 from the scene and light 64 from the side does not get through so that the gain in skylight is counterbalanced by the overall loss of light and net effect is less light rather than more. Statistics show that when the sky is bright, the scene is usually bright and hence direct light is enough without the skylight. But when the scene is dim, the sky is so dim that even skylight is not bright enough to overcome the loss of light in the ground glass (due to some of the light being diffused back as well as forward). It is probably primarily for this reason that ground glass does not solve the problem; it is no better than trying to use the light directly from the scene.

In considering this problem, it occurred to me that in the great majority of scenes which are ordinarily photographed there should be enough light areas or bright areas within an angle of about 45° on each side of the axis or a total angle of 90° and that some layer or medium having controlled diffusion or directed diffusion limited to this angle or a somewhat smaller one would provide the indirect light needed without any backward diffusion and would thus give a brighter frame image. It then occurred to me that lenticular film base such as has been used in lenticular film photography would give a limited diffusion through an angle comparable to this although somewhat smaller. This film is made up with about 600 to 1000 cylindrical lenticules per inch and is described, for example, in "Photography—Its Materials and Processes," by Neblette, 5th edition, pages 445 to 448, and in "History of Color Photography," by Friedman, Chapter 16 and particularly Chapter 17. The angle through which the incident light would be scattered or spread by such a lenticular film base depends upon the radius of curvature and width of the lenticules. Friedman, on page 234, gives data for a typical example which spreads the light through an angle 30° each side of the direction of the incident beam. Of course there is a very small amount of "back-scattered" light due to imperfections in the film and surface reflections but this loss is very much less than the amount lost by ground-glass diffusers.

At the other end of the scale I have found that there must be appreciable diffusion beyond 20° since less than this tends to act as if no diffuser were present, i.e. to receive only light from the scene itself. The need for the present invention arises when there is not enough light from the scene itself.

FIGS. 3 and 5 show a detail of FIG. 1 namely a portion of the plate 15, the frame mark 16 and the lenticular screen 17. The diagonally shaded area of FIG. 3 represents the darkened, that is, opaque or nearly opaque, portions of the plate 15 and the lighter area shows a portion of the frame mark 16 with the parallax mark 31 which is provided in known manner to help the photographer to correct the parallax between the finder and the camera objective. FIG. 3 shows the upper left-hand portion of the frame marks, which is the portion shown in the lower right-hand corner in FIG. 1 because the assembly is shown upside down in FIG. 1.

FIG. 5 shows a greatly enlarged diagrammatic section of FIG. 3 near one of the transparent lines 16 with the transparent support 51 on the side opposite the lenticular film 17 which is separate from the plate 15 in the example shown. Sectional shading has been omitted for clarity in the diagram. In front of the plate 15 is shown a piece of lenticular film 17. This film may be turned either way; as shown, it has the lenticules to the front. Incident on the front of the lenticular film are several light rays more or less representative of the light from a typical scene. Assuming, for example, that there is a bright area in the upper part of the field of view, the two rays 54 and 55 represent the light coming from this area. Ray 54 strikes the lenticule surface substantially normally and proceeds undeviated until it strikes the rear surface of the lenticular film base at which time it is deviated downward. After proceeding through the frame mark 16 and supporting plate 51, it emerges parallel to its direction of emergence from the lenticular screen. Other rays from this same bright area will be deviated into different directions within the angle of diffusion of the screen; among them will be one ray 55 which is deviated so that it goes into the direction such that it passes through the frame mark and finder system and to the eye position so that it serves to make the frame mark appear bright. Other rays 55' and 55" will strike other lenticules in the same manner and will be deviated the same as ray 55 so as to illuminate the frame mark. Light coming from another direction is represented by ray 56 which is drawn with long dashes to indicate for example, that it comes from an area of moderate brightness in the picture scene. All the rays coming from this direction are spread out within the limit of angle of diffusion as in the case of the rays 54 and 55, ray 56 being the one that proceeds in the direction to add to the illumination of the frame marks, and there are many such rays through each lenticule. Similarly, a ray 57 which is shown in short dashes and may be taken as coming from a part of the object field which is comparatively dark represents another bundle of rays which is spread out throughout the limited angle of diffusion, the one ray being shown which is bent into the direction in which it proceeds to the eye position. The photographer using the camera will thus see the frame mark as a series of horizontal bright lines at those portions of the lenticules which are illuminated by bright areas in the field of view such as rays 55, 55', 55" interspersed with less bright or dark areas over those portions of the lenticules which are illuminated by rays from darker portions of the field.

The reason will now be evident why it is important to have more than one lenticule cover each frame mark—namely, that the apparent position of the frame mark might be displaced by the width of a lenticule and if the width of the lenticule were too great it would lead to undesirable inaccuracies of framing. It will be seen that when a lenticular screen is used with the lenticules in a horizontal direction that there will be a vertical band at the center of the field of view in which any bright area will effectively illuminate the frame mark, and that this band of effective illumination has a limited extent depending on the configuration of the lenticules. As above mentioned, in the case of the lenticular film base, this angle is approximately 30° on each side of the axis. Although a slight improvement might be effected by choosing a different angle of limited diffusion, the lenticular film base is readily available material and I find that it gives a very striking improvement over systems having either no diffuser or high diffuser such as ground glass.

FIGS. 4 and 7 correspond to FIGS. 3 and 5 and show a somewhat different form of the invention. In this form of the invention, the limited diffusion screen is made up of a myriad of small closely contiguous lenticules in a honeycomb arrangement and substantially covering the surface of the sheet of transparent material 71. This type of limited diffusing material is also available and is described in Patent No. 2,589,014 McLeod. In the material that is available, normal incidence light is deviated about 22° into a conical shell around the direction of incidence. It will be understood that although FIG. 4 shows only a portion of the area as covered with these lenticules, the diffusion screen which is now available has its whole surface so covered. However, I contemplate that if a special mold is made up for molding plates out of plastic for the purposes of the present invention, then it would only be necessary to cover the frame mark 16 and the parallax marks 31 with perhaps a little overlapping into the dark area. As applied to combined rangefinder-viewfinder of certain types, a certain portion of the center of the area must be free of diffusing lenticules to permit the passage of the rangefinding beam.

FIG. 7 shows a group of rays 75 striking the conical screen from such a direction that they are redirected toward the eye position and are effective in making the frame line 16 bright if there is a bright area in the field of view in this direction. Another group of rays 76 is shown in short dashes to indicate for example that they may originate in a portion of the scene which is comparatively dark and thus they will be comparatively ineffective in illuminating the frame mark 16. The net effect of the conical screens is to provide a controlled or limited amount of diffusion such that if there is a bright area in the field of view in a circular zone lying at about 22° from the center of the field, then this bright area is effective in illuminating the frame marks. Here again it may be preferable to provide cones which are a little steeper and deviate the rays through a somewhat larger angle, but this particular angle was readily available having been made up for a different purpose, and it has been found to be very effective in making the frame marks appear bright as superimposed upon the object field as viewed from the eye position of the view-finder. The conical screen has an advantage over the cylindrical lenticules in one particular condition of use in which there is a small bright source of light above the center of the object field or off to one side. Under these conditions, the frame marks will appear to be of uneven brightness around the rectangular frame in the case of the cylindrical lenticules, whereas in the case of the conical screens the brightness is more uniform around the whole rectangle. On the other hand, under certain other circumstances, the cylindrical lenticules are superior.

FIG. 5 shows the emulsion into which the frame mark is photographed provided on a separate film base 51, and in contra-distinction thereto FIG. 7 shows the emulsion 72 coated on the lenticular sheet 71. It will be readily understood that the emulsion can equally well be coated on the sheet of cylindrical lenticules 53 thus dispensing with the separate film base 51, and that on the other hand, in using the conical screen shown in FIG. 7, the emulsion can be coated on a separate film base as in FIG. 5. It is not considered necessary to show separate drawings showing these various combinations. Moreover, the invention is not limited to the case in which the frame mark is made photographically but it may be made by depositing any nontransparent substance such as silver or aluminum or ink onto a transparent support sheet or in any other known way of making a pattern which is transparent over part of its area and substantially opaque over the rest of it.

In the conical screen there are or may be small substantially flat areas at the peaks of the cones and in the valleys between them and the frame thus may receive a small amount of illumination near the center of the field indicated by the dashed line 77.

Furthermore, it may be pointed out that lenticular screens of limited diffusion according to the invention can be used reversed front for back so that the frame mark is on the front and the lenticules on the back or if the lenticules are on a separate support from the frame mark, they can without departing from the spirit of the invention, be positioned behind the frame mark in close proximity thereto without causing the frame outline to be too fuzzy in appearance. When positioned in front of the frame mark, however, the lenticules can be at any convenient distance therefrom and still be just as effective as if they were closely adjacent thereto so long as the area of the lenticular screen is sufficient to provide the required illumination and is not so large as to cut off the direct view.

Other embodiments of the invention will readily occur to those skilled in the art, such as the use of elliptical lenticules, or any other partly diffusing material which diffuses normal incidence light over an angle between 20° and 45° to the normal and these variations are considered to be within the scope of the invention as defined in the following claims.

I claim:

1. In a camera viewfinder of the type having means for combining light from the scene being viewed with light from a frame reticle, the combination comprising an opaque mask having transparent frame marks facing said scene and means for efficiently illuminating said frame marks by ambient light, which means consists of a sheet of transparent material immediately in front of the frame marks having approximately contiguous lenticules on one surface of the material with at least three lenticules to the width of the frame mark and with at most two thousand lenticules to the linear inch, the lenticules being dimensioned to diffuse normal incidence light over an angle between 20° and 45° from the normal.

2. The combination according to claim 1 in which the transparent marks are between 0.0015 and 0.008 inch wide and each lenticule is between one fifth and one third the width of the marks.

References Cited in the file of this patent

UNITED STATES PATENTS

| | | |
|---|---|---|
| 2,067,843 | Tonnies | Jan. 12, 1937 |
| 2,217,930 | Zimmerman | Oct. 15, 1940 |
| 2,358,316 | Chwalow | Sept. 19, 1944 |
| 2,589,014 | McLeod | Mar. 11, 1952 |

FOREIGN PATENTS

| | | |
|---|---|---|
| 805,591 | Germany | May 25, 1951 |